(12) United States Patent
James

(10) Patent No.: US 9,469,768 B1
(45) Date of Patent: Oct. 18, 2016

(54) POWDER COATING COMPOSITION USEFUL AS A FINISH

(71) Applicant: Joseph H. James, Brentwood, TN (US)

(72) Inventor: Joseph H. James, Brentwood, TN (US)

(73) Assignee: PISON STREAM SOLUTIONS, Brentwood, TN (US)

( * ) Notice: Subject to any disclaimer, the term of this patent is extended or adjusted under 35 U.S.C. 154(b) by 478 days.

(21) Appl. No.: 13/895,876

(22) Filed: May 16, 2013

Related U.S. Application Data

(60) Provisional application No. 61/653,164, filed on May 30, 2012.

(51) Int. Cl.
| | |
|---|---|
| *C08F 8/00* | (2006.01) |
| *C08F 8/30* | (2006.01) |
| *C08F 283/04* | (2006.01) |
| *C08G 18/08* | (2006.01) |
| *C08K 3/00* | (2006.01) |
| *C08K 5/00* | (2006.01) |
| *C08L 33/08* | (2006.01) |
| *C08L 33/10* | (2006.01) |
| *C08L 33/12* | (2006.01) |
| *C09D 5/03* | (2006.01) |
| *C09D 133/08* | (2006.01) |
| *C09D 133/10* | (2006.01) |
| *C09D 133/12* | (2006.01) |
| *C09D 175/06* | (2006.01) |
| *C08L 75/06* | (2006.01) |

(52) U.S. Cl.
CPC . *C09D 5/03* (2013.01); *C08F 8/00* (2013.01); *C08F 8/30* (2013.01); *C08F 283/04* (2013.01); *C08G 18/08* (2013.01); *C08K 3/00* (2013.01); *C08K 5/00* (2013.01); *C08L 33/08* (2013.01); *C08L 33/10* (2013.01); *C08L 33/12* (2013.01); *C08L 75/06* (2013.01); *C09D 5/035* (2013.01); *C09D 5/037* (2013.01); *C09D 133/08* (2013.01); *C09D 133/10* (2013.01); *C09D 133/12* (2013.01); *C09D 175/06* (2013.01)

(58) Field of Classification Search
CPC .......... C08F 8/00; C08F 8/30; C08F 283/04; C08G 18/08; C08K 3/00; C08K 5/00; C08L 75/06; C08L 33/08; C08L 33/10; C08L 33/12; C09D 5/03; C09D 5/035; C09D 5/037; C09D 175/06; C09D 133/08; C09D 133/10; C09D 133/12
USPC .......................... 524/507; 525/123, 131, 455
See application file for complete search history.

(56) References Cited

U.S. PATENT DOCUMENTS

| | | | | |
|---|---|---|---|---|
| 3,950,285 | A * | 4/1976 | Wolgemuth | 528/363 |
| 5,596,043 | A * | 1/1997 | Harris | C08F 8/30 |
| | | | | 428/423.1 |
| 5,744,522 | A * | 4/1998 | Prucnal | C08G 59/4238 |
| | | | | 523/442 |
| 7,585,908 | B1* | 9/2009 | James | 524/196 |
| 2006/0134402 | A1* | 6/2006 | Wilkenhoener | C08J 3/28 |
| | | | | 428/323 |
| 2006/0173098 | A1* | 8/2006 | Tsujimoto | B01J 2/16 |
| | | | | 523/205 |

FOREIGN PATENT DOCUMENTS

WO  WO 94/10221  *  5/1994

\* cited by examiner

*Primary Examiner* — Patrick Niland
(74) *Attorney, Agent, or Firm* — Thompson Hine LLP

(57) ABSTRACT

A chemical resistant powder coating composition comprising a urethane-polyester powder coating resin, a styrene-free hydroxyl functional acrylic resin, and a hardener. The composition may contain a flow aid that is a combination of a polyester hydroxyl resin, polyethylene resin, and spherical glass flakes and having introduced silica type carriers.

14 Claims, No Drawings

POWDER COATING COMPOSITION USEFUL AS A FINISH

CROSS-REFERENCE TO RELATED APPLICATION

This application claims the benefit of U.S. Provisional Application 61/653,164 filed May 30, 2012.

BACKGROUND OF THE INVENTION

Powder coating compositions are dry free flowing powders applied in the fusion coating process. A fusion coating process is a process in which a coating powder is distributed over a substrate and, when heated fuses to form a continuous film. The substrate may be heated or unheated when the powder is applied thereto. Heat supplied from the substrate or from an external source, such as an oven, causes the powder to fuse into the continuous film. Known fusion coatings processes for application of powder coating compositions to a substrate include electrostatic spraying, fluidized bed coating and hot flocking.

Powder coating compositions may be made of many different resin materials including polyurethanes, TGIC resins, Primid resin systems, epoxy resins, hybrid polyester and epoxy resin combinations (e.g., epoxy, epoxy-polyester), urethane-polyester, TGIC-free polyesters which are free of triglycidylisocyanurate (TGIC) and acrylic coating materials. Other components or constituents include curatives, flow aids, degassing agents, catalysts, pigments, modifiers, fillers and charge inhibitors.

Chemical agent resistance coatings (CARC) are coatings that resist the absorption of chemical warfare agents making decontamination easier to accomplish with vehicles, artillery pieces, missile launchers, aircraft, tanks and Humvee's. One of the problems facing CARC powder coating platforms for military applications is that current powder coating binder platforms formulated using epoxies, hybrids, certain polyurethanes, Primids, and TGIC's lack the required CARC properties for the gloss range less than 1.5@60 degree angle, required color tolerances, chemical resistance, and the absence of infrared detection, to provide exterior durability properties, which is outlined for Type III Coatings—Camouflage 383 Green, 686 Tan per Mil-PRF-32348. Previously there have not been any top coat CARC powder coatings available on the market which passed the specification requirements with the absence of a CARC primer system.

SUMMARY OF THE INVENTION

One of the advantages of CARC coatings in accordance with the present invention in comparison to other CARC coating platforms is their high chemical resistance characteristics and resistance to STB (Super Tropical Bleach), low gloss ranges, matte smooth finish, and UV characteristics as a top coat per Mil-PRF-32348MIL CARC requirements. Embodiments of formulations of the invention can be applied directly to a substrate or primer at about 1.0-2.0 mils thickness, for example, as a recoat to primer binder systems such as epoxy, epoxy-hybrid, polyurethane, and TGIC systems for additional or enhanced properties, if desired.

A powder coating composition according to one embodiment of the invention comprises about 85 to about 99.9% by weight of a finish (e.g., top coat) powder coating platform. Unless otherwise stated, all percentages stated herein are weight percentages based on the total composition or a component thereof as disclosed herein.

Powder coatings in accordance with the invention comprise a urethane-polyester powder coating resin, a styrene-free hydroxyl functional acrylic resin, and a hardener or curative. Polyester-urethane resins are thermosetting powder polyesters with either (OH) hydroxyl or (COOH) carboxyl functionality. These products can be combined with curatives to form high quality, low gloss CARC polyurethane powder coatings. These compositions provide low gloss without using matte agents or fillers such as barium and calcium sulfates. Matte fillers like these are not necessary because the compositions of the invention, when cured, meet low gloss military specifications. Examples of hardeners include tetramethoxy glycoluril. Examples of curatives include Crelan NI2 blocked cycloaliphatic polyisocyanate, Dow chemical's TGIC, (triglycidylisocyanurate), Epikure 101 imidazole adduct, Epikure P-108 DICY imidazole adduct, aliphatic and cycloaliphatic amine curing agent from (Momentive Industries) and phenolic hardener DEH84 from Dow Chemical, AG500. In certain embodiments of the invention, the formulation may include additive resins, pigments, waxes, catalyst, flow aids, degassing agents, and gloss modifiers may be included in the powder coating material composition.

Examples of polyester urethane hydroxyl resins useful in free powder in one embodiment include Rucote 102, 106, and Rucote 118 from Bayer Material Science, and SP-100 and SP-400 from Sun Polymers. Also useful are polyester urethane carboxylic functional resins such as Sun Polymers SSP-011 and SP-033, and polyester-urethane carboxyl TGIC resins such as Sparkle SP-8400 Polyester carboxylic functional resin from Sun Polymers, AA-16005F Polyester carboxylic functional resin from Sun Polymers, and Fineclad M-8900 Polyester carboxylic functional resin, from Reichold Chemicals. Representative examples of epoxy-polyester resins includes: Crylcoat 2401-2, Crylcoat 2471-4 from Cytec Industries.

Examples of styrene-free hydroxyl functional acrylic resin include AH-12450 SF resin from Sun Polymers, Albester 6310 and 6140 resin from Momentive.

In one embodiment, the polyester-urethane is present in an amount of about 45 to 90 parts by weight and the styrene-free hydroxyl functional acrylic is present in an amount of about 3 to 10 parts by weight relative to the polyester-urethane. The curative is used in an amount effective to cure the resins upon fusing.

The platform of the current invention is particularly advantageous because in various embodiments and applications it is effective as:

a. Resistant to decontaminating agent: STB (Super Tropical Bleach)
b. Low matte gloss finish <2.0 85 degree
c. Within specified color range spectrum for 383 Green
d. UV resistant
e. Cure temperature range: 15 mins@375 F or 20 mins@350 F in convection oven
f. Meets spectral reflectance limits
g. Meets (NBS) <2.0 outline by National Bureau of Standards.

DETAILED DESCRIPTION

In a more particular embodiment of the invention the CARC is formulated from a combination of polyester hydroxyl urethane, styrene-free hydroxyl function acrylic resins, spherical glass flakes, blended in conjunction with additional constituents such as polymeric curatives, degassing agents, surfactants, and modified polyacrlates. Polyacrylates are polymers or co-polymers of esters of methacrylic and acrylic acids. Additional flows aids and leveling agents includes Resiflow P-67 (Estron Chemical), Resiflow P-1200 (Estron Chemical), Resiflow P-65, (Estron Chemical) Oxymelt A-2, (Estron Chemical, and Modaflow 2000 from Cytec and X-22 from Monsanto, PF45, from Pison Stream Solutions as disclosed in U.S. application Ser. No. 13/872,648 filed Apr. 29, 2013 which is incorporated herein in its entirety by reference. That flow aid is a combination of polyester hydroxyl resin, polyethylene resin, and spherical glass flakes blended in conjunction with additional constituents such as polymeric curatives and degassing agents and extruded as master batch and having introduced (3-aminoproply)trimethoxysilane and silica type carriers such as silicone dioxide at (45-55% active).

The coatings of the invention provide a smooth matte coating finish design as a top coat non-primer application with special characteristics, for passing the viscous tests describe in Mil-PRF-32348 for CARC Powder coating top coats.

In other embodiments of the invention, the powder coating formulations can include additionally a thermosetting powder coating resin material selected from one more of the group of epoxy, epoxy-polyester and TGIC-free polyester resins. Conventional additives, such as hardeners, tetramethoxy glycoluril, pigments, waxes, catalyst, flow aids, degassing agents and gloss modifiers may be included in the powder coating material composition. Representative and suitable epoxy resins is Kukdo Epoxy resin KD-242U, KD-242U is specially designed bisphenol-A type solid epoxy resin which has excellent flow characteristics. KD-242U has an epoxy equivalent weight specification of 0.05 max. (wt %), a softening point specification of 1000-4000 (cps at 150 C., a melt viscosity of specification of 1000-4000 (cps at 150 C.) and a volatile content specification of 0.30 maximum (wt. %) suitable hardeners includes Kukdo KD-401, KD-41, KD-410J, Epikure 101 and Dyhard 100.

Dow/Bayer D.E.R 663U is a solid epoxy resin and is a standard medium molecular weight resin for powder coatings application. The resin has an epoxy equivalent weight specification of 730-820 (g/eg); a softening point specification of 92-102 C. and a melt viscosity specification of 2000-4000 (cps at 150 C) suitable hardeners include Kukdo KD-401, KD-41, KD-410J, Epikure 101 and Dyhard 100.

TABLE 1

| Constituents Control Component | Example (wt %) (approx.) | Amount (wt.%) (approx.) |
|---|---|---|
| 1. Styrene-free hydroxyl functional acrylic | 2.5 | 3.1-9.5 |
| 2. Polyester urethane powder binder | 81.17 | 44-90 |
| 3. Polymeric curative | 31.37 | 25-45 |
| 4. Degassing agent | 1.02 | .25-2.0 |
| 5. Flow additive | 1.79 | .5-3.0 |
| 6. Glass Flake | 10.0 | 20-50 |
| 7. Tin Catayst | 1.0 | 0.5-2.0 |
| 8. Mapico Tan 20a (Magnesium Ferrite) | 2.81 | 2.5-3.0 |
| 9. V-12600 (Chromite) | 10.28 | 10.0-10.35 |
| 10. 110M Pigment (Iron Red Oxide) | .046 | .040-.050 |
| 11. Cinquasia violet L 5120 | 0.05 | 0.025-0.08 |
| 12. Precipitated Silica | 1.49 | 1.0-3.0 |
| 13. G-8599 Chrome Green Oxide | 14.76 | 13.8-15.0 |

Table Descriptions
1. AH-1250SF from Sun Polymers.
2. Polyester Hydroxyl Resins: Rucote 118, 102, 106, Sun Polymer SP011, SP033, SP400.
3. Curatives: Crelan NI2 Blocked Cycloaliphatic Polyisocyanate, Crekat XP 2571, TGIC (triglycidylisocyanurate), Alcure 4400, 4402, and 4450 block aliphatic and aromatic polyisocyanate curatives.
4. Surfynol's 104S from Surfynol Inc and CM500W degassing agent, from ZCP Inc. China.
5. PF45, from Pison Stream Solutions. Additional flows aids and leveling agents includes Resiflow P-67 (Estron Chemical), Resiflow P-1200 (Estron Chemical), Resiflow P-65, (Estron Chemical) Oxymelt A-2, (Estron Chemical, and Modaflow 2000 from Cytec and X-22 from Monsanto,
6. ECR Glass Flake's GF100, 200 and 300, China's Glass Flake's Co, C-28, C-90 and C-150.
7. Stannous octoate catalyst, 65% 2-methyl imidazole, 65% 2-Propyl imidazole, 60% Active Dibutyl Tin Dilaurate; Octaflow ST-70 stannous octoate catalyst from Estron Inc, Actiron NXJ60 P from Prox-chem Inc, Curaid 2PI-P, Curaid 2MI-P, from Danick Specialties.
8. Mapico 20-A pigment, Rockwood Pigments NA, Inc, Tan 20A, GmbH.
9. V-12600 Cobal Chromite Green Pigment, from Geode Inc, V-12600 Camouflage Green Pigment from Ferro Corporation, V-12600 Hi IR Green Cool Colors, Tavco Chemicals Inc. G8599 Chrome Green Pigment from Rockwood Pigments, V-12650 Cobalt III Chromite green pigment.
10. Cinquasia violet R-NRT Violet from All Colour Inc, Cinquasia Violet L 5120 from BASF.
11. Precipitated Silica, Acematt HK450, Sipernat 160, from Evonik, Zeolex 330 amorphous sodium aluminosilicate from Huber Inc, USA, Silica Carrier 3-Aminopropyl)triethoxysilane/Silicone Dioxide Precipitated Amorphous Silicate (Master batch Polymer).
12. 4-4006 Green Chromium Oxide from Elementis Inc.

Formulations in accordance with the invention may be prepared by admixing the polyester resin binder, curative, and degassing agent, spherical flake and other components either with a tumbler for 55-65 minutes or with a mixaco high speed mixer used for blending raw material constituents for 30-45 seconds at ambient temperature and pressure or until such components are fully blended. Next the admixture is extruded to distribute the constituents and form an extrusion product. Any suitable extruder may be used including a single or twin screw extruder. The blended material is placed in the extruder hopper and fed via the screw mechanism to the extruder dye, preferably with three temperature zones. The zone settings may be, respectively, 60/60/140° F. The blended constituents are extruded at 300 RPM and at a feed rate of 400 g/min to form an extrusion product. The extrusion sheet product is then ground into particles with a suitable grinding machine such as a Retch mill grinder or coffee grinder. The extrusion product is grounded for 1-5 minutes at ambient temperature and pressured to form a powder typical between 25-50 μm. This powder represents the binder system and constituents from Table (1) 1-11. Afterward this material can be used as desired or as per Mil-PRF-32348. The formulation described above is a unique and novel topcoat platform designed for Military "CARC" applications to withstand chemical agents. It provides the following properties and advantages:
1. Its chemical make-up for gloss reduction without using standard fillers such as $BaSO_4$ and $CaCO_3$ for reduce gloss allows the coating surface to withstand a host of chemical reagents including tropical bleach.
2. Gloss reduction less than 2.0@85 degrees.

3. Improves mar and scratch up to 2H pencil hardness following standard ASTM 3363 methods for Pencil Hardness test. Pencil hardness standard ranges are as follows: 6B, 5B, 4B, 3B, 2B, B, HB, F, H, 2H, 3H, 4H, 5H, and 6H.
4. Chemical resistance to a host of reagents such as acetic acid, sulfuric acid, hydrochloric acid and acetic anhydride corrosive acids and bases such as sodium hydroxide (NaOH) and Potassium hydroxide (KOH) which are all key reagents used for obtaining certification for coating platforms.
5. Binder platform is cured @10 at 375° F. or 20 at 350° F. using a convection ovens such as laboratory oven from Blue M, White Deer Pa.
6. Meets spectral reflectance limits (600-770 nm)
7. Meets (NBS) less than 2.0 outline by National Bureau of Standards.

Having described the invention in detail and by reference to preferred embodiments thereof, it will be apparent that modifications and variations are possible without departing from the scope of the invention as defined by the following claims.

What is claimed is:

1. A chemical resistant powder coating composition comprising:
   a urethane-polyester powder coating resin;
   a styrene-free hydroxyl functional acrylic resin;
   a hardener or a curative; and
   glass flakes;
   wherein, upon curing, the chemical resistant powder coating composition has a gloss of less than 2.0 at an angle of 85 degrees.

2. The powder coating of claim 1 wherein the urethane-polyester resin is a thermosetting powder urethane polyester resin having hydroxyl or carboxyl functionality.

3. The powder coating of claim 2 wherein the hardener is selected from the group consisting of tetramethoxy glycoluril, a blocked cycloaliphatic polyisocyanate, triglycidylisocyanurate, an imidazole adduct, aliphatic and cycloaliphatic amine curing agent, a phenolic hardener, and mixtures thereof.

4. The powder coating of claim 2 wherein the urethane-polyester resin is present in an amount of about 45 to 90 parts by weight and the styrene-free hydroxyl functional acrylic resin is present in an amount of about 3 to 10 parts by weight relative to the polyester-urethane.

5. The powder coating composition of claim 1 wherein the composition additionally includes a flow aid.

6. The powder coating composition of claim 1 wherein the composition additionally includes a thermosetting powder coating resin.

7. The powder coating of claim 6 wherein the thermosetting powder coating resin is selected from the group consisting of epoxy, epoxy-polyester, and TGIC-free polyester resins.

8. A chemical resistant powder coating composition comprising a composition shown in the following table:

| Constituents Control Component | Amounts (wt.%) (approx.) |
|---|---|
| Styrene-free hydroxyl functional acrylic | 3.1-9.5 |
| Polyester urethane powder binder | 44-90 |
| Polymeric curative | 25-45 |
| Degassing agent | .25-2.0 |
| Flow additive | .5-3.0 |
| Glass Flake | 20-50 |
| Tin Catayst | 0.5-2.0 |
| Precipitated Silica | 1.0-3.0. |

9. The powder coating composition of claim 8 wherein the coating has the composition shown in the following table:

| Constituents Control Component | Amounts (wt %) (approx.) |
|---|---|
| Styrene-free hydroxyl functional acrylic | 2.5 |
| Polyester urethane powder binder | 81.17 |
| Polymeric curative | 31.37 |
| Degassing agent | 1.02 |
| Flow additive | 1.79 |
| Glass Flake | 10.0 |
| Tin Catayst | 1.0 |
| Magnesium Ferrite | 2.81 |
| Chromite | 10.28 |
| Iron Red Oxide | .046 |
| Cinquasia violet L 5120 | 0.05 |
| Precipitated Silica | 1.49 |
| Chrome Green Oxide | 14.76. |

10. A chemical resistant powder coating composition comprising:
    a urethane-polyester powder coating resin present in an amount of about 45 to about 90 parts by weight, the urethane-polyester powder coating resin having hydroxyl or carboxyl functionality;
    a styrene-free hydroxyl functional acrylic resin present in an amount of about 3 to about 10 parts by weight relative to the polyester-urethane powder coating resin;
    a hardener or a curative; and
    glass flakes.

11. The powder coating of claim 10 wherein the hardener is selected from the group consisting of tetramethoxy glycoluril, a blocked cycloaliphatic polyisocyanate, triglycidylisocyanurate, an imidazole adduct, aliphatic and cycloaliphatic amine curing agent, a phenolic hardener, and mixtures thereof.

12. The powder coating of claim 10 wherein the composition additionally includes a flow aid.

13. The powder coating composition of claim 10 wherein the composition additionally includes a thermosetting powder coating resin.

14. The powder coating of claim 10 wherein the thermosetting powder coating resin is selected from the group consisting of epoxy, epoxy-polyester, and TGIC-free polyester resins.

* * * * *